Figure 1:
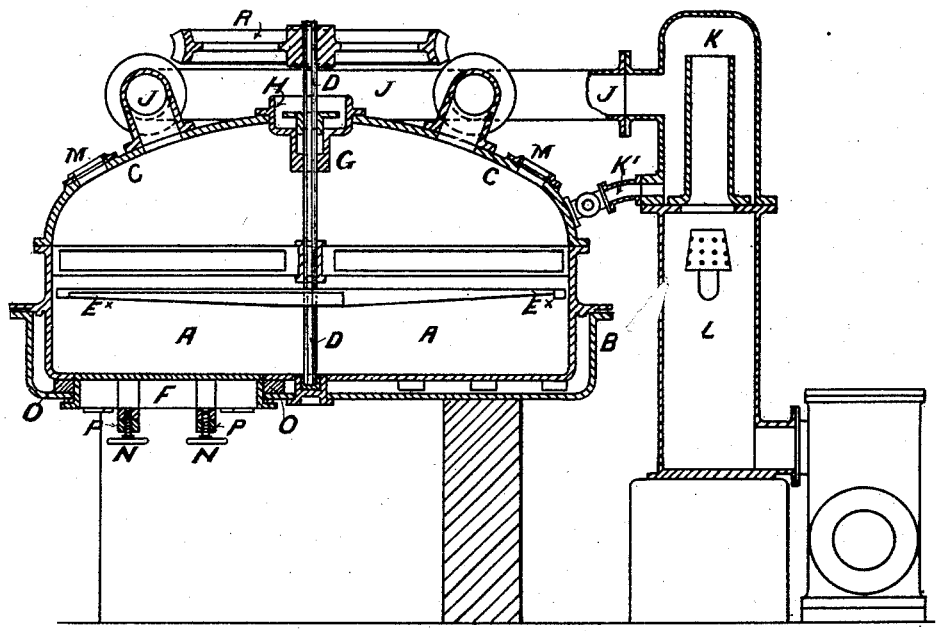

(No Model.)

J. F. JOHNSTONE.
DRIER.

No. 327,948. Patented Oct. 6, 1885.

WITNESSES:

John Forsyth Johnstone INVENTOR

BY

John McCarthy ATTORNEY

UNITED STATES PATENT OFFICE.

JOHN FORSYTH JOHNSTONE, OF BOW COMMON LANE, COUNTY OF MIDDLESEX, ASSIGNOR TO HUGH JOHN ANDERSON, No. 101 LEADENHALL STREET, LONDON, ENGLAND.

DRIER.

SPECIFICATION forming part of Letters Patent No. 327,948, dated October 6, 1885.

Application filed March 5, 1885. Serial No. 157,751. (No model.) Patented in England May 7, 1884, No. 7,387; in Italy July 22, 1884, No. 17,170; in Victoria August 23, 1884, No. 3,819; in South Australia August 28, 1884, No. 482; in Sweden September 28, 1884, No. 1,559; in Queensland October 3, 1884, No. 38; in New South Wales October 15, 1884, No. 1,517; in Spain October 21, 1884, No. 6,299, and in Denmark November 13, 1884, No. 1,380.

*To all whom it may concern:*

Be it known that I, JOHN FORSYTH JOHNSTONE, a subject of the Queen of Great Britain, residing at Brooksby Chemical Works, Bow Common Lane, Middlesex, England, have invented certain new and useful Improvements in Apparatus for Drying Waste Animal Matters, Fish, and other Materials; applicable also to the concentration of liquids, (for which I have received Letters Patent in Great Britain No. 7,387, dated May 7, 1884; in Italy, No. 17,170, dated July 22, 1884; in Victoria, No. 3,819, dated August 23, 1884; in South Australia, No. 482, dated August 28, 1884; in Sweden dated September 28, 1884; in Spain, No. 6,299, dated October 21, 1884; in Denmark, No. 1,380, dated November 13, 1884, and Letters of Registration in New South Wales and Queensland,) of which the following is a specification.

My improvements in apparatus for drying all kinds of waste animal matter, fish, or other matter, or for the concentration of liquids, relate to alterations in and additions to the machine known as "Johnstone's Drying-Machine," for which a patent was granted to me in the United States of America dated September 18, 1883, No. 285,135.

The object of my alterations in and additions to the above-mentioned machine is to enable it to dry or concentrate the materials within it *in vacuo.*

I construct the steam-jacketed pan of the improved machine or apparatus, together with the agitators and their springs or scrapers and the vertical shaft supporting it and actuating them, all substantially as described in the specification of the above-mentioned Letters Patent.

The cover of the machine has hitherto been made of very light material not capable of withstanding any considerable pressure and not so constructed and attached to the pan as to completely exclude the ingress or egress of air or vapor. This light and imperfectly-tight cover I replace by one made in one or more parts securely jointed to the pan and to any brackets within the pan upon which it rests, and sufficiently strong to bear the atmospheric pressure when there is a vacuum within the pan. I prefer to make this cover domed in in shape. The vertical shaft of the machine is supported vertically and laterally as heretofore, but where it passes through the cover the latter is provided with a gland, which is to be so packed as to form an air-tight joint. A sufficient space is left between the cover and the worm-wheel or other apparatus by means of which the shaft is driven to permit of the withdrawal and packing of the gland. Around the upper part of this gland I provide a vessel or cup surrounding the gland and the shaft, which cup at the same time serves as a receptacle for oil or other lubricant and as a further means both of testing and securing the joint.

The cover of the machine is fitted with sight and light glasses and air-cock, and is furnished with a man-hole, through which the interior of the pan may be inspected, and the material to be treated may be introduced, where the character of this material renders this a convenient way of introducing it. This man-hole is provided with an easily-adjusted air-tight lid.

When the material to be treated is of a liquid consistency, the machine is provided with a suitable pipe and cock or valve, through which the material may flow into the machine by the action of gravity or otherwise, or be drawn into it by the action of the vacuum created within it.

The vapor generated within the machine is conveyed by a suitable pipe to a condenser, which may be either a surface-condenser, a jet-condenser, or of other construction. It will in some cases be advantageous to introduce a "save-all" between the pan and the condenser. Any material which may boil over in the pan, and which would otherwise pass the condenser and pass away with the condensing water or through the air-pump, will be arrested in the save-all, and may be returned to the machine.

In some cases an ejector-condenser or a

Siemens or Kortings steam-jet exhauster or a jet-condenser with Torricellian tube so arranged and proportioned as to entangle and carry away air with the condensing water may be used for producing the vacuum; but in most instances it is more convenient to employ a vacuum-pump (which may be driven in any convenient way) for this purpose.

The discharge-opening, passing through the bottom of the pan and of its jacket, through which the finished material drops, has hitherto been closed by a door fitting loosely within it. The upper surface of the door being on the same level as the bottom of the pan, the spaces around the door between it and the opening quickly became filled with portions of the solid material contained in the pan, which speedily prevented any considerable leakage of the fluid matters. A door thus constructed could not be made sufficiently tight under vacuum, and, accordingly, while retaining the arrangement which makes the upper surface of this door continuous, or nearly so, with the bottom of the pan, I make it tight with a flange-joint closing, preferably, upon india-rubber.

In the drawings hereunto annexed I have shown apparatus constructed as above described.

Figure 2:
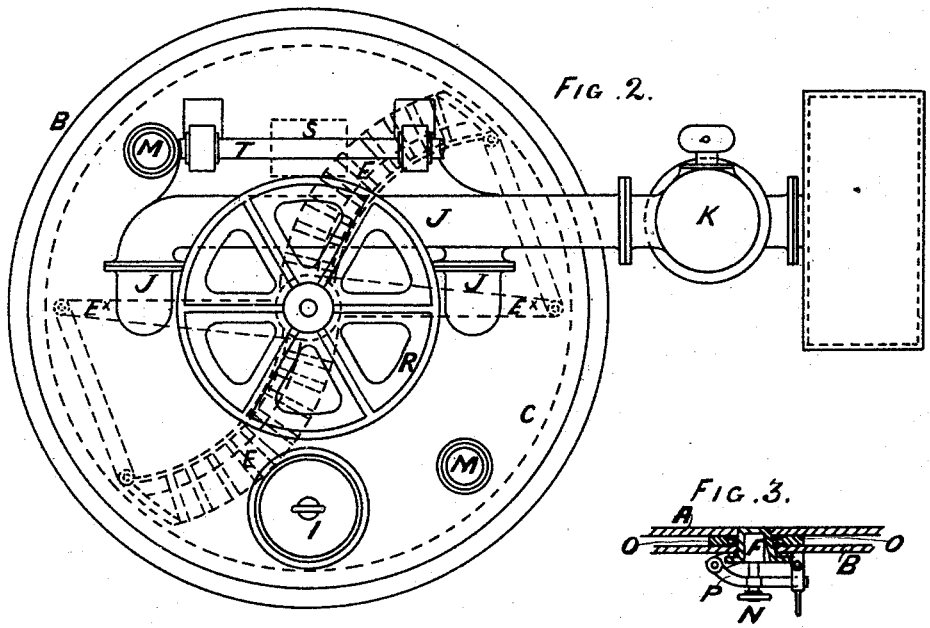
Figure 3:
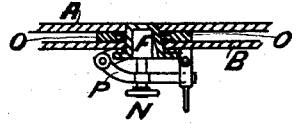

Figure 1 is a vertical section, and Fig. 2 a plan view, of the apparatus. Fig. 3 is a section taken crosswise through the discharge-door, which is at the bottom of the pan.

A is the pan of the apparatus, surrounded by a steam-jacket, B.

C is a dome-shaped cover closing over the top of the pan.

D is a vertical axis having arms E$^\times$ extending from it which carry scrapers E, to scrape over the bottom of the pan.

F is the discharge-door, which closes the discharge-outlet formed through the bottom of the pan and the steam-jacket.

The cover C, as above stated, is made sufficiently strong to withstand the pressure of the atmosphere where there is a vacuum within the pan. It is formed with a flange around its edge, to be bolted down onto a corresponding flange formed around the top edge of the pan, so that an air-tight joint may be formed between them. At the center of the top of the cover is a gland or stuffing box, G, through which the axis D passes, and which is packed so as to form an air-tight joint around the axis.

H is a cup or vessel surrounding the upper part of the gland, to contain oil or other liquid to lubricate the axis, and also indicate whether the packing of the gland is in or out of order.

I is a man-hole formed through the cover, and which can be closed air-tight by a lid. The materials to be dried can be fed into the pan through this man-hole. When liquid matters are to be dried up or evaporated, the cover might also have a pipe led off from it, through which the liquid might be allowed to flow into the pan.

J J are outlet-pipes passing from the cover to a save-all, K, and from there to a condenser, L, in which a vacuum is maintained. In the drawings, the condensation is effected by a spray of cold water, and the vacuum is maintained in the condenser by means of an air-pump of ordinary construction; but, as before stated, any other ordinary means for maintaining a vacuum might be employed.

K' is a pipe by which any matters arrested in the save-all can pass back to the pan.

M M are two sight-holes formed through the cover. They are glazed with glass so that no air can enter through them. The discharge-door F is, as shown at Figs. 1 and 3, formed with a projecting flange to come against the under side of the steam-jacket. When the door is closed, it is pressed upward by two screws, N, to force its flange toward the bottom of the steam-jacket.

O is elastic packing placed between the bottom of the steam-jacket and the flange, to make an air-tight joint.

The screws N screw through arms P, which can be turned on the same axis as the door F, but which are held up, as shown at Fig. 3, when the door is closed. The door is made to turn very loosely upon its axis so that when closed it may be pressed upward by turning the screws.

R is a worm-wheel fast on the axis D. It is driven continuously by a worm, S, on a driving-shaft, T, which is carried in bearings upon the top of the cover, as shown in Fig. 2; but other ways of giving a continuous revolving motion to the axis might be adopted, if desired.

Having now particularly described and ascertained the nature of my said invention and in what manner the same is to be performed, I declare that what I claim is—

1. The combination of the steam-jacketed pan A, cover C, fitted thereto with an air-tight joint, stuffing-box G, with axis D passing down through it and carrying scrapers E, outlet-door F, which can be closed air-tight, and outlet-pipe J, passing to apparatus by which a vacuum can be maintained in the pan A, substantially as described.

2. The combination of the steam-jacketed pan A, cover C, fitted thereto with an air-tight joint, stuffing-box G, with axis D passing down through it and carrying scrapers E, outlet-door F, which can be closed air-tight, outlet-pipe J, opening into a save-all, K, and condenser L, and apparatus for maintaining a vacuum in this condenser, substantially as described.

JOHN FORSYTH JOHNSTONE.

Witnesses:
J. WATT,
G. W. WESTLEY,
 Both of 17 Gracechurch St., London.